United States Patent
Hayashi

(10) Patent No.: US 10,994,742 B2
(45) Date of Patent: May 4, 2021

(54) DRIVING ASSISTANCE DEVICE

(71) Applicant: DENSO CORPORATION, Kariya (JP)

(72) Inventor: Tatsuya Hayashi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/505,811

(22) Filed: Jul. 9, 2019

(65) Prior Publication Data

US 2019/0329787 A1    Oct. 31, 2019

Related U.S. Application Data

(63) Continuation of application No. PCT/JP2018/000924, filed on Jan. 16, 2018.

(30) Foreign Application Priority Data

Feb. 21, 2017 (JP) .............................. JP2017-030063
Nov. 21, 2017 (JP) .............................. JP2017-223689

(51) Int. Cl.
*B60W 40/09* (2012.01)
*B60W 50/14* (2020.01)
*G06K 9/00* (2006.01)
*B60W 40/08* (2012.01)

(52) U.S. Cl.
CPC ............ *B60W 40/09* (2013.01); *B60W 50/14* (2013.01); *G06K 9/00845* (2013.01); *B60W 2040/0809* (2013.01); *B60W 2050/146* (2013.01)

(58) Field of Classification Search
None
See application file for complete search history.

(56) References Cited

U.S. PATENT DOCUMENTS

2014/0309813 A1* 10/2014 Ricci ..................... G06F 16/583
701/2
2015/0081399 A1* 3/2015 Mitchell ............ G06Q 10/0639
705/7.38

FOREIGN PATENT DOCUMENTS

JP    2011034430 A    2/2011

* cited by examiner

*Primary Examiner* — Curtis A Kuntz
*Assistant Examiner* — Shawna M Kingston
(74) *Attorney, Agent, or Firm* — Harness, Dickey & Pierce, P.L.C.

(57) ABSTRACT

A driving assistance device for assisting a driving of a vehicle is configured to: acquire an operation state for the vehicle by a driver; acquire a driving characteristic of the driver according to the operation state; acquire a driving frequency of the driver with respect to the vehicle; and notify the driver of information relating to the driving characteristic at intervals corresponding to the driving frequency.

6 Claims, 3 Drawing Sheets

DRIVING ASSISTANCE DEVICE

CROSS REFERENCE TO RELATED APPLICATIONS

The present application is a continuation application of International Patent Application No. PCT/JP2018/000924 filed on Jan. 16, 2018, which designated the United States and claims the benefit of priority from Japanese Patent Application No. 2017-030063 filed on Feb. 21, 2017 and Japanese Patent Application No. 2017-223689 filed on Nov. 21, 2017. The entire disclosures of all of the above applications are incorporated herein by reference.

TECHNICAL FIELD

The present disclosure relates to a driving assistance device that assists a vehicle driving by a driver.

BACKGROUND

A driving assistance device has been proposed such that the device obtains driving characteristics of a driver driving a vehicle based on driver's preference, habit, ability, etc., and notifies the driver in the form of advice or the like. Further, in such a driving assistance device, various measures have been taken at which timing the device notifies the driver of the obtained driving characteristic.

SUMMARY

A driving assistance device for assisting a driving of a vehicle is configured to: acquire an operation state for the vehicle by a driver; acquire a driving characteristic of the driver according to the operation state; acquire a driving frequency of the driver with respect to the vehicle; and notify the driver of information relating to the driving characteristic at intervals corresponding to the driving frequency.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
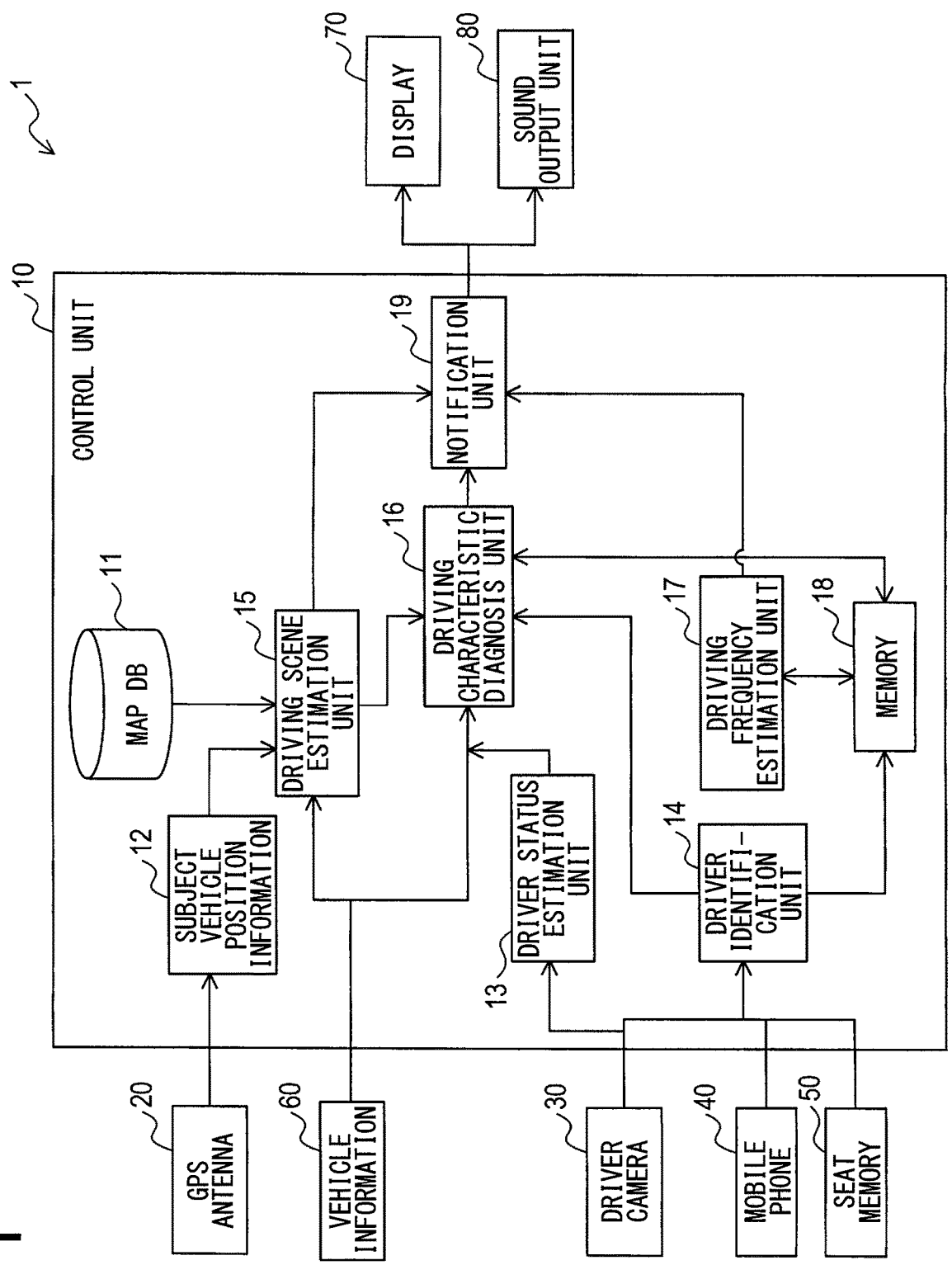
FIG. 1 is a block diagram showing a configuration of a driving assistance device to which the present disclosure is applied.

For example, a new notification is performed when a certain period of time has elapsed since the previous notification, or when the vehicle traveled a certain distance since the previous notification.

However, there is a concern that the notification effect varies depending on the driving frequency of the driver when notification is made when a certain time has elapsed or when the vehicle travels a certain distance. For example, when notification is made at regular time intervals, for drivers with low driving frequency, notification is made at a high frequency, for example, notification is made each time the driver drives a vehicle. Further, during the notification, since the driver rarely drives the vehicle, the driving characteristics may not be changed, and the same notification is made each time. Therefore, the driver feels annoying in some notifications. On the other hand, for drivers with high driving frequency, the driver may consider that the frequency of the notification is low, and there may be cases where the effect of improving safety etc. by notifying the driver may not be sufficiently exerted.

According to an example embodiment, a driving assistance device is provided for setting the notification frequency of driving characteristics according to the driving frequency of a driver.

According to an aspect of the example embodiment, a driving assistance device configured to assist a driving of a vehicle includes: an operation acquisition unit configured to acquire an operation state for the vehicle by a driver; a driving characteristic acquisition unit configured to acquire a driving characteristic of the driver according to the operation state acquired by the operation acquisition unit; a frequency acquisition unit configured to acquire a driving frequency of the driver with respect to the vehicle; and a notification unit configured to notify the driver of information relating to the driving characteristic acquired by the driving characteristic acquisition unit at intervals corresponding to the driving frequency acquired by the frequency acquisition unit.

The operation acquisition unit is configured to acquire an operation state by the driver with respect to the vehicle. The driving characteristic acquisition unit is configured to acquire the driving characteristic of the driver based on the operation state acquired by the operation acquisition unit. The frequency acquisition unit is configured to acquire the driving frequency by the driver with respect to the vehicle. The notification unit is configured to notify the driver of information relating to the driving characteristic acquired by the driving characteristic acquisition unit at intervals corresponding to the driving frequency acquired by the frequency acquisition unit. According to such a configuration, the notification frequency of the information relating to the driving characteristic of the driver acquired by the driving characteristic acquisition unit can be set to the intervals according to the driving frequency acquired by the frequency acquisition unit.

Hereinafter, embodiments for implementing the present disclosure will be described with reference to the drawings.

Note that in this specification, the driving characteristic may be any characteristic as long as it includes the characteristic (i.e., tendency) of the driving operation of the vehicle by the driver such that the timing for putting on a blinker is fast or late, the inter-vehicle distance with the preceding vehicle is long or short, the acceleration or deceleration is sudden or slow.

First Embodiment

1-1. Configuration

The driving assistance device 1 shown in FIG. 1 is mounted in a vehicle (hereinafter referred to as the subject vehicle), and mainly includes a control unit 10. The control unit 10 mainly includes a conventional microcomputer having a map database 11, a CPU not shown in the drawings, and a semiconductor memory such as a RAM, a ROM, and a flash memory not shown in the drawings. Various functions of the control unit 10 are realized by the CPU executing a program stored in a non-transitory tangible storage medium. In this example, the semiconductor memory corresponds to the non-transitory tangible storage medium in which the program is stored. In addition, by executing the program, a method corresponding to the program is executed. The number of microcomputers constituting the control unit 10 may be one or more.

As shown in FIG. 1, the control unit 10 as a configuration of a function realized when the CPU executes a program includes a subject vehicle position information acquisition unit 12, a driver status estimation unit 13, a driver identification unit 14, a driving scene estimation unit 15, a driving characteristic diagnosis unit 16, a driving frequency estimation unit 17, a memory 18, and a notification unit 19. In FIG. 1, the map database is abbreviated as a map DB, and the subject vehicle position information acquisition unit is abbreviated as subject vehicle position information. A method of realizing these elements constituting the control unit 10 is not limited to software, and a part or all of the elements may be realized by using hardware in which a logic circuit, an analog circuit, or the like are combined.

The subject vehicle position information acquisition unit 12 acquires information indicating the position of the subject vehicle from the GPS antenna 20 provided in the subject vehicle. The subject vehicle position information acquisition unit 12 may acquire the information indicative of the subject vehicle position by another method such as a method using a GNSS standard other than the GPS standard, a method using a gyroscope, a method using map matching process, and a method using communication with a roadside device. Here, the GPS is an abbreviation of Global Positioning System. The GNSS is an abbreviation of Global Navigation Satellite System.

The driver status estimation unit 13 acquires the image of the face of the driver photographed by the driver camera 30 arranged in the driver's seat of the subject vehicle, and analyzes the status of the driver (e.g., an inattentive driving, a drowsy driving, etc.) according to the image analysis.

The driver identification unit 14 acquires information from the above-described driver camera 30, the mobile phone 40 carried by the driver, and the seat memory 50 related to the driver's seat, and identifies the driver. For example, the driver identification unit 14 may image-analyze the image of the face of the driver photographed by the driver camera 30, and specify the driver by a conventional face authentication method.

Alternatively, the driver identification unit 14 may specify the driver based on the information acquired via communication when the mobile phone 40 is connected to the subject vehicle by wired connection. Alternatively, the driver identification unit 14 may specify the driver based on the information acquired when the mobile phone 40 and the subject vehicle are connected via wireless communication according to the standard such as Bluetooth (registered trademark). In these cases, instead of the mobile phone 40, another portable terminal such as a tablet terminal or a laptop computer may be used. Alternatively, the mobile terminal may be a smart key, and the mobile phone 40 itself may function as a smart key.

When the driver registers the position of the driver's seat desired by the driver in the seat memory 50, the registered position is read out from the seat memory 50, and the driver identification unit 14 may simply specify the driver based on whether the driver's seat is disposed at that position.

Alternatively, the driver identification unit 14 may execute any one of these identification methods, or may comprehensively identify the driver by performing a plurality of identification methods. Variety of conventional methods such as a method of weighting and combining each identification method together, a method of simple majority decision, and the like may be applied as a method of comprehensively identifying the driver. Alternatively, the driver identification unit 14 may specify the driver based on other information (for example, a driver's fingerprint image) that is different from both the image of the driver's face, the information from the mobile terminal and the information from the seat memory 50.

Based on the map data stored in the map database 11, the position of the subject vehicle acquired by the subject vehicle position information acquisition unit 12, the vehicle information acquired by the vehicle information acquisition unit 60, and the like, the driving scene estimation unit 15 estimates the driving scene indicative of the driving condition of the vehicle. The vehicle information acquisition unit 60 detects the status of the subject vehicle, and is configured with one or a plurality of sensors. The vehicle information acquisition unit 60 acquires at least one of the operation state of the direction indicator, the accelerator opening degree, the brake operation state, the steering wheel angle, and the surrounding information as vehicle information. Here, the surrounding information is, for example, the inter-vehicle distance with the preceding vehicle, the presence of an obstacle around the subject vehicle, the position of a boundary line such as a white line or a yellow line or a road stud, and the like. The driving scene estimation unit 15 estimates (i.e., determines) the driving scene for each driving condition such that the unit 15 sets "a left turn driving scene" when the subject vehicle turns to the left at the intersection, the unit 15 sets "a right turn driving scene" when the subject vehicle turns right at the intersection. In FIG. 1, the vehicle information acquisition unit is abbreviated as vehicle information.

The driving characteristic diagnosis unit 16 acquires the driving characteristic (for example, driving habit) of the driver based on the driving scene estimated by the driving scene estimation unit 15 and the vehicle information acquired by the vehicle information acquisition unit 60. For example, the driving characteristic diagnosis unit 16 may evaluate the state of the vehicle with respect to a predetermined evaluation item, and diagnose the driving characteristic indicative of the tendency of the driving operation of the driver, thereby acquiring the driving characteristic. Alternatively, when diagnosing the driving characteristic, the driving characteristic diagnosis unit 16 may refer to the status of the driver (for example, an inattentive driving, drowsy driving, etc.) estimated by the driver status estimation unit 13. Alternatively, when the driver status estimation unit 13 is capable of acquiring a driver status such as an annoyed expression or a gentle expression on the driver face, the driving characteristic diagnosis unit 16 may also acquire the irritation or impatience as the driving characteristic.

The driving frequency estimation unit 17 acquires the driving frequency of the vehicle with respect to the driver identified by the driver identification unit 14. When the driver identification unit 14 specifies that the driver of the subject vehicle is a specific person (for example, the owner of the subject vehicle), the driving frequency estimation unit 17 may estimate the driving frequency by counting the driving frequency of the driver. In that case, the driving frequency estimation unit 17 stores the driving frequency of the driver in the memory 18. In the memory 18, the driving characteristic of the driver obtained by the driving characteristic diagnosis unit 16 is stored in association with the driving frequency of the driver.

Alternatively, when the driver of the subject vehicle is specified as one of a plurality of persons registered in advance, the driving frequency estimation unit 17 may acquire the driving frequency by counting the driving frequency for each driver. In that case, the driving frequency estimation unit 17 stores the identification information such as the ID assigned to each driver and the driving frequency by the driver in association with each other in the memory 18. In that case, the driving characteristic of the driver acquired by the driving characteristic diagnosis unit 16 is stored in the memory 18 in association with the identification information of the driver and the driving frequency. It should be noted that the registration may be additionally executed each time the driver identification unit 14 newly identifies another person as a driver. Hereinafter, this case will be explained as an example.

The notification unit 19 notifies the driver of the subject vehicle of the information relating to the driving characteristic acquired by the driving characteristic diagnosis unit 16 at intervals corresponding to the driving frequency acquired by the driving frequency estimation unit 17. The notification unit 19 may output a drive signal to a display unit 70 (for example, a liquid crystal display) arranged in front of the driver's seat of the subject vehicle, and display characters or images corresponding to the information, thereby notifying the information. Alternatively, the notification unit 19 may output a drive signal to the sound output unit 80 (for example, a speaker) arranged in the passenger compartment of the subject vehicle to output sound relating to the information, thereby notifying the information.

Alternatively, the notification may be made at a timing when the driving scene determined by the driving scene estimation unit 15 becomes a driving scene with a low driving operation load. Whether the driving operation load is low may be determined based on whether the driving scene coincides with the driving scene registered in advance as a driving scene with a low driving operation load. Whether the operation load is low may be determined based on whether the driving operation load at each time point is equal to or less than a predetermined value set in advance under a condition that the driving operation load at each driving scene is digitized. Alternatively, it may be determined by other methods.

1-2. Process

Next, the process executed by the control unit 10 will be described with reference to the flowchart of FIG. 2. Note that this process is repeatedly executed at predetermined intervals while the power source of the vehicle turns on, based on the program stored in the ROM arranged in the control unit 10, using the CPU arranged in the control unit 10.

Figure 2:
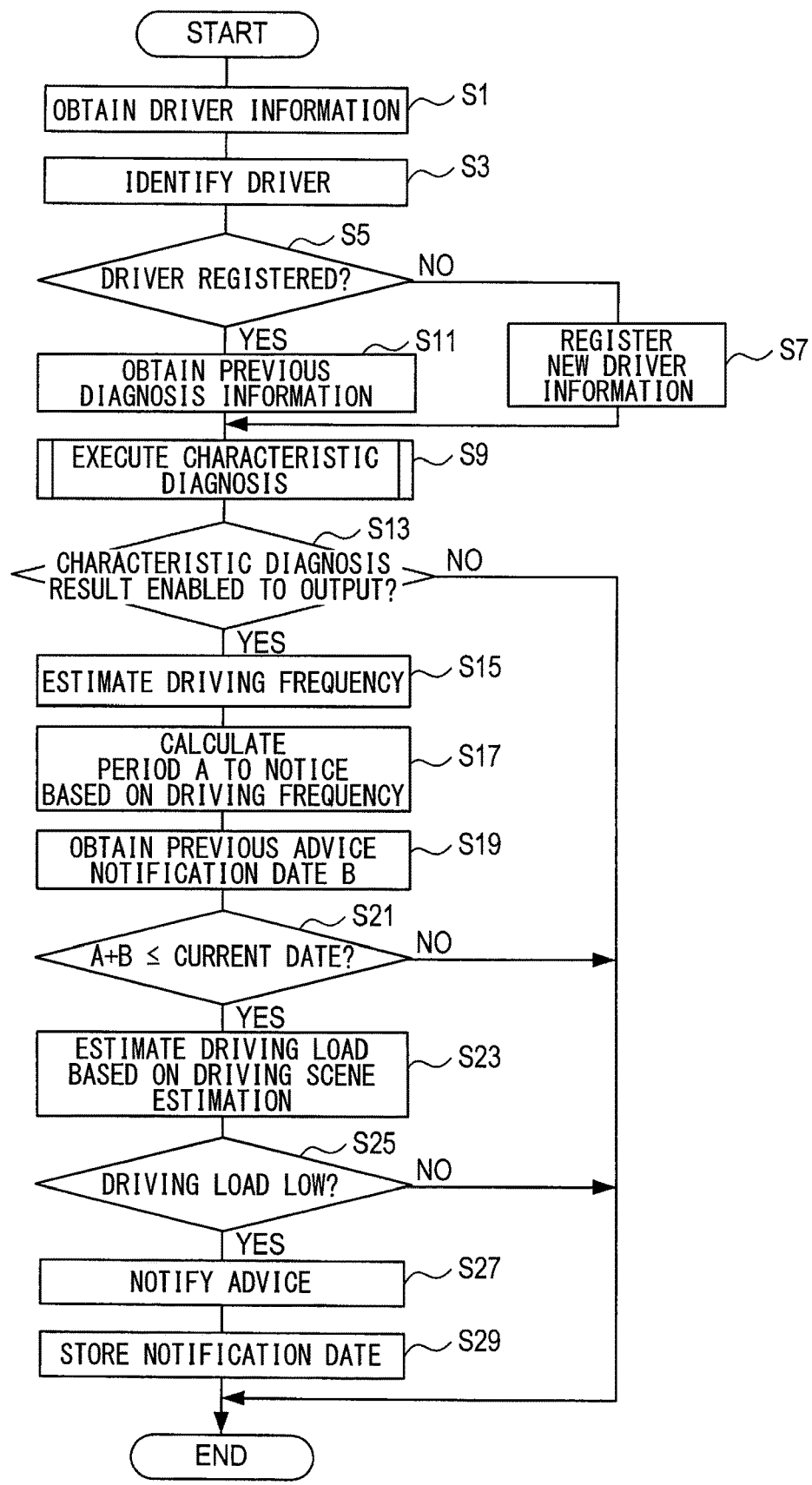
FIG. 2 is a flowchart showing a process executed by a control unit of the driving assistance device.

As shown in FIG. 2, in this process, first, at S1, the driver information such as an image of the driver's face, information from the mobile phone 40 or information from the sheet memory 50 is acquired, and at the following S3 the driver of the subject vehicle is specified based on the driver information. As described above, these are processes as the driver identification unit 14.

In the following S5, it is determined whether the driver specified in S3 is an already registered driver. If the driver is not an already registered driver, it is judged as NO in S5, and the process proceeds to S7. In S7, after the driver specified in S3 is registered as a new driver, the process proceeds to S9. Note that the information registration in S7 may be a process for storing, in the memory 18, information for identifying the driver such as an image of the face of the driver, information from the mobile phone 40 or information from the sheet memory 50, and identification information such as ID assigned to the driver. In that case, the driver identification unit 14 refers to the data set of the information for identifying the driver and the identification information stored in the memory 18, and specifies the driver as the process of S3.

When it is determined in S5 that the driver identified in S3 is a registered driver (that is, YES in S5), the process proceeds to S11. After the past diagnostic information (i.e., already acquired driving characteristic) relating to the driver is acquired, the process proceeds to S9. In S9, the characteristic diagnosis process shown in detail in FIG. 3 is executed.

Figure 3:
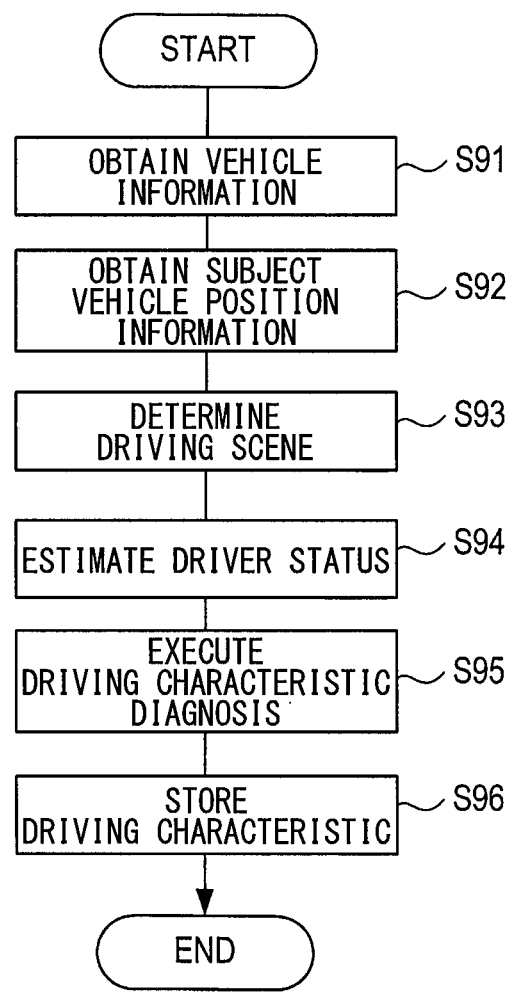
FIG. 3 is a flowchart showing a characteristic diagnosis process in detail of the above process.

In this process, as shown in FIG. 3, first, the above described vehicle information is acquired from the vehicle information acquisition unit 60 in S91 which is the process for providing the driving scene estimation unit 15 and the driving characteristic diagnosis unit 16. Subsequently, by executing S92 as the process for providing the vehicle position information acquisition unit 12, information indicating the position of the subject vehicle is acquired. Subsequently, the driving scene of the subject vehicle is determined by executing S93 as the process for providing the driving scene estimation unit 15. Subsequently, the status of the driver is estimated by executing S94 as the process for providing the driver status estimation unit 13.

Subsequently, the driving characteristic of the driver is diagnosed by executing S95 as the process for providing the driving characteristic diagnosis unit 16. For example, the habit and tendency of the driver such as a way of the driver for accelerating and decelerating, a degree of keeping the following distance with the preceding vehicle and the like are diagnosed. Various conventional driving characteristics as described in Patent Literature 1 may be diagnosed as the driving characteristic, for example. In the following S96, the driving characteristic diagnosed in S95 is stored in the memory 18, and the process proceeds to S13 of FIG. 2.

In S13, it is determined whether the diagnosis result of the driving characteristic stored in the memory 18 in the process of S96 is sufficiently accumulated to the extent that it is output to the driver as the diagnosis result of the driving characteristic. Since the diagnosis of the driving characteristic of the driver is a diagnosis relating to the habit and tendency of the driver, in some cases, no result is obtained with one trip. The term "one trip" refers to the period from when the power source turns on and the driver starts driving to when the power source turns off and the driver stops driving. Each driving characteristic can be output as the diagnostic result of the driving characteristic within about 20 hours to 30 hours that depends on the type, the shape and the traffic condition of the road to be traveled. Note that the driving characteristic will be updated in full within about 20 hours to 30 hours. For example, for a person who drives the vehicle five times a week for a round-trip about one hour, it is possible to output a reliable diagnostic result to some extent for the first time after the diagnosis result has accumulated for about one month since the person started driving. In S13, it is determined whether the diagnosis result of the driving characteristic is sufficiently accumulated in the memory 18 to such a degree that a reliable diagnostic result can be output to some extent. When it is not sufficiently accumulated, NO is determined in S13, and the process is temporarily ended at that moment.

After the diagnostic result of the driving characteristic is sufficiently accumulated in the memory 18 to the extent that a reliable diagnostic result can be outputted, the oldest diagnostic result is deleted from the memory 18 every time the diagnostic result of the driving characteristic is newly stored in the memory 18 by the process of S96. Therefore, the diagnostic result of the driving characteristic changes each time the characteristic diagnosis process of S9 is executed.

When it is determined in S13 that the diagnosis result of the driving characteristic is sufficiently accumulated (that is, YES) to the extent that a reliable diagnostic result can be outputted, the process proceeds to S15. In S15 as the process for providing the driving frequency estimation unit 17, the driving frequency for the subject vehicle by the driver currently driving the subject vehicle is acquired. In the following S17, the period A for notifying (that is, outputting) the driving characteristic as advice is calculated on a daily basis according to the driving frequency acquired in S15. For example, for a driver who drives the vehicle every day at commuting (i.e., ten times a week), the driving characteristic is notified ever month. For a driver who drives the vehicle twice a week on the weekend (i.e., four times a week by counting a roundtrip), the driving characteristic is notified every two months. Thus, in S17, the period A of the periodic notification advising the driving characteristic is changed in accordance with the driving frequency.

In the following S19, the date B on which the driving characteristic was notified as advice at the previous time is acquired. Then, in S21, it is determined whether the current date reaches or passes a day which is calculated by adding the period A with the date B. When the current date does not reach the date of A+B, NO is determined in S21, and the process is temporarily ended as that moment. On the other hand, when the current date reaches or passes the date of A+B, YES is determined in S21, and the process proceeds to S23. The date and time is acquired from the system relating to the GPS antenna 20. Alternatively, when the subject vehicle does not have the GPS antenna, the date and time may be acquired from the time set for the vehicle.

In S23, the driving load is estimated based on the driving scene determined by the process (e.g., S93) for providing the driving scene estimation unit 15. In the following S25, it is determined whether the driving load estimated in S23 is low. That is, in the processes of S23 and S25, it is estimated whether the state of the driving load is safe even when the notification is made to the driver at the present time, by referring to the vehicle information, the driver information or the map information. A state with low driving load may be, for example, a state in which the vehicle stops at a traffic signal, a state in which there is no preceding vehicle while traveling on a straight section of a highway, and the like. On the other hand, a state where the driving load is high may be a state that the vehicle is to be parked or in a traffic jam.

Whether the driving operation load is low may be determined based on whether the driving scene coincides with the driving scene registered in advance as a driving scene with a low driving operation load. Whether the operation load is low may be determined based on whether the driving operation load at that time point is equal to or less than a predetermined value set in advance under a condition that the driving operation load at each driving scene is digitized. Alternatively, it may be determined by other methods.

When the driving load is not low, NO is determined in S25, and the process is temporarily ended at that moment. On the other hand, when the driving load is low, it is determined as YES in S25, and the process proceeds to S27. In S27, the driving characteristic of the driver is notified as an advice, and in S29, the date on which the notification is made is stored, and the process is temporarily ended.

1-3. Effects

According to the first embodiment described above, the following effects are obtained.

(1A) In the present embodiment, the driving characteristic is notified as advice at intervals (that is, period A) corresponding to the driving frequency acquired in S15. Therefore, the notification frequency of the driving characteristic is set to be an appropriate interval at which a possibility for the driver to feel the burden of the notification is low, and the effect such as improvement of safety by notification is sufficiently expected.

(1B) Further, the driving frequency is the numerical number of times the driver drives the subject vehicle per week as the predetermined period, and the interval is the number of days calculated according to the numerical number of times. For this reason, the following effects are obtained as compared with a case where the notification to the driver is executed each time the driver drives the vehicle for a certain period of time.

For example, in a case where the vehicle is continuously driven for a long time, when the notification is made each time the vehicle is driven for a certain period of time, there is a possibility that the notification would be made many times during one trip. In that case, when the notification is made many times during a traffic jam, the driver may be annoyed to the notification. On the other hand, according to the present embodiment, when the interval of the notification is set on a daily basis according to the numerical number of times of the driving (that is, the number of trips) per predetermined period, such a situation is avoidable. In addition, even in a case of driving for a short period of time, when the driver drives the subject vehicle many times on the same route, for example, at commuting, the notification is made at intervals corresponding to the number of trips as in this embodiment, so that the effects of the safety improvement may be high. Here, the predetermined period may be another period such as 10 days, one month, or the like.

(1C) In addition, the interval is calculated as the number of days to be shorter as the numerical number of times is larger, and the number of days is calculated such that the product of the numerical number of times and the number of days is larger as the numerical number of times is larger. Therefore, it is possible to suppress the notification interval of the driving characteristic for the driver whose driving frequency is very low from becoming too long, compared to the case where the number of days is calculated such that the product becomes a constant value. For example, as shown in the following Table 1, for a driver with the driving frequency (that is, the numerical number of times the driver drives the subject vehicle per week) of 0.1 times, when the product is constant at 300, the notification is made only once per 3000 days. On the other hand, in the case where the product becomes larger as the numerical number of times is larger, all drivers can receive the notification at intervals corresponding to the driving frequency, the intervals being in a range between 20 days and 100 days in the example of Table 1.

TABLE 1

| Frequency (the number of times) | Intervals (the number of days) | | Product of the number of times and the number of days | |
|---|---|---|---|---|
| | Case where the product becomes larger as the number of times increases | Case where the product is constant | Case where the product becomes larger as the number of times increases | Case where the product is constant |
| 21 | 20 | 14.28571429 | 420 | 300 |
| 14 | 25 | 21.42857143 | 350 | 300 |
| 10 | 30 | 30 | 300 | 300 |
| 4 | 60 | 75 | 240 | 300 |
| 2 | 75 | 150 | 150 | 300 |
| 1 | 90 | 300 | 90 | 300 |
| 0.1 | 100 | 3000 | 10 | 300 |

(1D) In the present embodiment, it is determined whether the driver is a predetermined person (for example, one or more persons to which identification information is assigned) in the initial processes of S1 and S3. When the driver is the predetermined person, various processes are executed for the driver. Therefore, even when the subject vehicle is driven by several drivers, it is possible to appropriately acquire the driving characteristic with respect to each driver as the predetermined person, and appropriately notify the driver of the driving characteristic.

1-4. Correspondence of Elements

In the first embodiment, the process of S91 in the driving characteristic diagnosis unit 16, the driver status estimation unit 13 and the driving scene estimation unit 15 correspond to the operation acquisition unit. Further, the driving characteristic diagnosis unit 16 corresponds to the characteristic acquisition unit. Further, the driving frequency estimation unit 17 corresponds to the frequency acquisition unit. In addition, the driver identification unit 14 corresponds to a driver determination unit. The mobile phone 40 corresponds to a mobile terminal.

2. Other Embodiments

Although embodiments of the present disclosure have been described above, the present disclosure is not limited to the above-described embodiments, and various modifications can be made.

(2A) In the first embodiment, the operation state of the driver for the subject vehicle is acquired from the vehicle information acquisition unit 60, the driving scene estimation unit 15, and the driver status estimation unit 13. Alternatively, it is not limited to these units. For example, the operation state may be acquired from any one or two of the three units. Alternatively, the operation state may be acquired by other methods. For example, the driver's heart rate, the pressure at which the steering wheel is grasped, etc. may be referred to, and other parameters may be referred to.

(2B) In the first embodiment, the period A corresponding to the driving frequency is calculated on a daily basis. Alternatively, it is not limited to the daily basis. For example, the period A may be calculated in hours, or may be calculated in seconds. In those cases, the notification date B is counted as the notification time.

(2C) In the first embodiment, the driver is specified using the driver identification unit 14. Alternatively, it is not limited to the unit 14. For example, it may be assumed that the driver of the subject vehicle is always a specific person (for example, an owner of the vehicle), and the driver identification unit 14 and the process relating thereto may be omitted.

(2D) A plurality of functions of one element in the above embodiment may be implemented by a plurality of elements, or one function of one element may be implemented by a plurality of elements. A plurality of functions of a plurality of elements may be implemented by one element, or one function implemented by a plurality of elements may be implemented by one element. A part of the configuration of the above embodiment may be omitted. At least a part of the configuration of the above embodiment may be added to or replaced with another configuration of the above embodiment.

(2E) In addition to the above-described driving assistance device, the present disclosure may be realized by various features such as a system including the driving assistance device as a component, a program for functioning the computer to provide the driving assistance device, a non-transitory tangible storage medium such as a semiconductor memory storing the program, a driving assistance method or the like.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

Although the present disclosure has been made in accordance with the embodiments, it is understood that the present disclosure is not limited to such embodiments and structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. A driving assistance device configured to assist a driving of a vehicle, comprising:
a CPU and memory configured to:
acquire an operation state of a driver of the vehicle;
acquire a driving characteristic of the driver according to the acquired operation state;
acquire a driving frequency of the driver with respect to the vehicle; and
notify the driver of information relating to the acquired driving characteristic at intervals corresponding to the acquired driving frequency;
wherein:
the driving frequency is a numerical number of times the driver drives the vehicle during a predetermined period;
the intervals are a numerical number of days calculated according to the numerical number of times the driver drives the vehicle during the predetermined period; and
the numerical number of days is reduced as the driving frequency increases, and a product of the driving frequency and the numerical number of days increases as the driving frequency increases.

2. The driving assistance device according to claim 1, the CPU and memory being further configured to:
determine whether the driver of the vehicle is a predetermined person;

perform the acquisitions or notifications to the driver based on whether the driver of the vehicle is the predetermined person.

3. The driving assistance device according to claim 2, wherein:

the CPU and memory are further configured to determine whether the driver is the predetermined person based on an image obtained by photographing a face of the driver of the vehicle.

4. The driving assistance device according to claim 2, wherein:

the CPU and memory are further configured to determine whether the driver is the predetermined person by communicating with a mobile terminal carried by the driver of the vehicle.

5. The driving assistance device according to claim 2, wherein:

the CPU and memory specify the driver based on whether a driver's seat of the vehicle is disposed at a position set by the driver of the vehicle.

6. A driving assistance device configured to assist a driving of a vehicle, comprising:

a processor with a memory configured to:
acquire an operation state of a driver of the vehicle;
acquire a driving characteristic of the driver according to the operation state;
acquire a driving frequency of the driver with respect to the vehicle; and
notify the driver of information relating to the driving characteristic at intervals corresponding to the driving frequency;

wherein:
the driving frequency is a numerical number of times the driver drives the vehicle during a predetermined period;
the intervals are a numerical number of days calculated according to the numerical number of times the driver drives the vehicle during the predetermined period; and
the numerical number of days is reduced as the driving frequency increases, and a product of the driving frequency and the numerical number of days increases as the driving frequency increases.

* * * * *